United States Patent [19]

Wells et al.

[11] Patent Number: 6,063,424
[45] Date of Patent: May 16, 2000

[54] PROCESS FOR STABILIZATION OF OIL FROM PLANT MATERIALS

[75] Inventors: Daniel M. Wells, Abbeville, La.; James A. Belcher, Middlebury, Conn.

[73] Assignee: LipoGenics, Inc., Phoenix, Ariz.

[21] Appl. No.: 09/143,929

[22] Filed: Aug. 29, 1998

Related U.S. Application Data

[60] Provisional application No. 60/057,395, Aug. 29, 1997, and provisional application No. 60/067,438, Dec. 3, 1997.

[51] Int. Cl.⁷ ........................................ A23B 9/30
[52] U.S. Cl. ................... 426/331; 426/479; 426/601; 426/636; 426/654
[58] Field of Search ................... 426/601, 636, 426/654, 474, 331

[56] References Cited

U.S. PATENT DOCUMENTS

| | | |
|---|---|---|
| 4,049,686 | 9/1977 | Ringers et al. . |
| 4,956,190 | 9/1990 | Chawan et al. . |
| 5,047,254 | 9/1991 | Lee . |
| 5,162,127 | 11/1992 | Weiss et al. . |

FOREIGN PATENT DOCUMENTS 2 141 438  12/1984  United Kingdom .

OTHER PUBLICATIONS

Database WPI, Section Ch, Week 9116, Derwent Publications Ltd., London, GB; Class D23, AN 91–112734, XP002086678 & JP 03 052997 A (Satake Seisakusho KK), Mar. 7, 1991 (Abstract).

Database WPI, Section Ch, Week 7911, Derwent Publications Ltd., London, GB; Class D23, AN 79–20900B, XP002086679 & JP 54 016512 (Nippon Oils & Fats Co Ltd), Feb. 7, 1979 (Abstract).

Database WPI, Section Ch, Week 7932, Derwent Publications Ltd., London, GB; Class D23, AN 79–58961B, XP002086680 & JP 54 081309 (Ajinomoto KK), Jun. 28, 1979 (Abstract).

Database WPI, Section Ch, Week 8005, Derwent Publications Ltd., London, GB; Class D13, AN 80–08121C, XP002086681 & JP 54 0158382 A (Kyokuto Shibosan K), Dec. 14, 1979 (Abstract).

Allen J.C., Hamilton, R.J.: "Rancidity in Foods", 1983, Applied Science Publishers, London New York XP002086676, pp. 80–81, 109–128.

Bockisch, M.: "Nahrungsfette und –Öle", (1993) Eugen Ulmer GMBH, Stuttgart XP002086677, pp. 259–261.

*Primary Examiner*—Helen Pratt
*Attorney, Agent, or Firm*—Hale and Dorr LLP

[57] ABSTRACT

The oil content of bran can be stabilized by the addition of a stabilizing agent to grain prior to, during or after milling of the grain, particularly rice. The treatment improves the yield of edible oil attainable when the oil is extracted from the milled bran.

11 Claims, No Drawings

PROCESS FOR STABILIZATION OF OIL FROM PLANT MATERIALS

This application claims the benefit of U.S. Provisional Applications 60/067,438 filed on Dec. 3, 1997 and 60/057,395, filed on Aug. 29, 1997.

This invention relates to the stabilization of oil in plant materials having a high oil content, and especially to those plant materials which also contain high levels of enzymes which degrade oils. More particularly, this invention relates to processes for stabilizing oil in legumes and grains, and has particular application to the oil in rice bran.

Oils in plant materials are subject to degradation by enzymes present in the plant material. Such breakdown begins immediately upon crushing or milling of the plant material, and in certain instances, can lead to sufficient degradation of the oil such that it is not economically feasible to extract an edible oil from the plant material. Breakdown of the oil in the bran of most grains is a particular problem due to the relatively high levels of degradative enzymes found in such grains and the difficulties faced when attempting to inactivate these enzymes.

For example, the oil from rice bran, which has a relatively high oil content and relatively high levels of oil degrading enzymes, is underutilized as a foodsource due to the rapid breakdown of the oil into free fatty acids which in turn are oxidized thus leading to rancidity. Breakdown of the oil in rice bran begins immediately after milling by action of lipases and other degradative enzymes hydrolyzing the oils to free fatty acids (FFA). Crude rice bran oil with FFA levels of over 10% generally is not economically suitable for edible oil production, and is designated as industrial oil for use in the manufacture of soaps and similar items. Hydrolysis of the oil occurs rapidly, at a rate of approximately 1% per hour for the first several hours after milling. Consequently, FFA levels of over 10% can readily accumulate thus significantly reducing the value of the oil as a foodstuff.

Stabilization of oil from cereal brans would increase the economic value of the bran and would make it possible to recover the oil for use as a foodstuff. Existing methods for stabilizing the oil in cereal bran involve cooking of the bran immediately after milling and subjecting milled bran to simultaneous high temperature and high pressure treatment such as that afforded by extruders used in the food processing industry. However, there remains a need for more economical means of stabilizing the oil in brans, especially in rice bran, which does not require the use of industrial food processing machinery.

It is an object of this invention to provide a method of stabilizing the oil in plant materials having a relatively high oil content and having oil degrading enzymes which does not require the use of industrial food processing equipment.

SUMMARY OF THE INVENTION

It has been found that the oil in plant materials, in particular the oil in plant materials having a relatively high concentration of oil and having oil degrading enzymes, can be stabilized without the use of industrial food processing equipment by the addition of a stabilizing agent either prior to or after milling of the plant material. Preferably the stabilizing agent is added to the plant material at the time of milling as the milling process facilitates efficient mixing of the stabilizing agent with the plant material. Preferably the plant material to be stabilized is a grain or legume having a relatively high oil content. More preferably the plant material to be stabilized is rice bran. Preferred stabilizing agents which act through reaction with cations comprise cyanide, sulfide, azide, carbon monoxide, ethylenediaminetetraascetic acid (EDTA), 1,10-phenanthroline, diethyldithiocarbamate (DDC), $\alpha$, $\alpha'$-dipyridyl, o-phenanthroline, orthophosphates, pyrophosphates, borates, carbonates, 8-hydroxyquinoline, thiourea, 2,3-dimercaptopropanol (BAL), mercaptoethanol, imidazole, mercaptoethylamine, and citric acid. Preferred stabilizing agents which act through reaction with thiol groups comprise chloroacetophenone, chloropicrin, bromobenzyl cyanide, fluoripyruvate, maleic acid, N-ethylmaleimide, quinones, acrolein, sorbic acid, acetoacetate, methylglyoxal, oxidized glutathione, sulfites, tetrathionate, performic acid, hydrogen peroxide, iodine, alloxan, porphyrexide, porphyrindin, O-iodobenzoate, ferricyanide, 5,5'-dithiobis (2-nitrobenzoic acid), 2-pyridine disulfide, and 4-pyridine disulfide. More preferred stabilizing agents comprise salts of bisulfate, bisulfite and metabisulfite, and such salts comprise sodium, potassium, ammonium, calcium, and magnesium. Preferably the stabilizing agent comprises sodium bisulfate, and sodium metabisulfite. Most preferably the stabilizing agent is sodium metabisulfite.

DETAILED DESCRIPTION OF THE INVENTION

In order that the invention described herein may be more fully understood, the following detailed description is set forth. In the description the following terms are used.

"Stabilization" means the treatment of a plant material to inhibit degradation of the plant oil. As a result of stabilization, the level of free fatty acids in the oil remains low, less than about 10%, thus allowing extraction of oil which is suitable as a foodsource for human consumption.

"Stabilizing agent" means an agent which when applied to the plant material either before or after millin, such as a grain either before or after milling the bran, acts to inhibit the degradation of the oil in the plant material. Preferred stabilizing agents comprise salts of bisulfate, bisulfite or metabisulfite. Stabilizing agents may further comprise sequestering agents, such as aminopolycarboxylic acids, hydrocarboxylic acids, and coordination compounds. Stabilizing agents may also comprise wetting agents, such as a surfactant.

In accordance with this invention, stabilization of the oil in plant materials is carried out by the addition of a stabilizing agent to the plant materials at the time of processing the plant material, such as by crushing or milling. Generally, the stabilizing agent is added to the plant material in an amount to inhibit the enzymes which degrade the plant oil. For example, up to about 10% stabilizing agent on a dry weight basis is added to the plant material prior to processing. As will be appreciated by a person of ordinary skill in the art, the quantity of stabilizing agent required to stabilize the oil in a particular plant material will depend upon the degradative enzymes present in the plant material and on the particular stabilizing agent used. For example, for the stabilization of cereal grains using one of the preferred stabilizing agents, which are salts of bisulfate, bisulfite or metabisulfite, between about 1% and about 10% of these stabilizing agents on a dry weight basis are added to the cereal grain prior to processing. Preferably less than about 5% on a dry weight basis of the stabilizing agent is added to the cereal grain prior to processing.

Tests for the activity of degradative enzymes present in the plant material after stabilization using the process of the invention have demonstrated that at least lipases and peroxidases are inactivated in the stabilized plant material.

The process of the invention is also useful for the preparation of Tocol products as described in co-pending application Ser. No. 07/952,615 filed Jan. 19, 1993 now abandoned the disclosure of which is hereby incorporated by reference.

The processes of this invention may be used to treat all types of plant materials and preferably to treat plant materials having a relatively high oil content such as is found in many grains and legumes. The process of this invention is particularly suitable for the stabilization of the oil in bran from rice. Following stabilization the stabilized oil may be extracted from the plant material and recovered therefrom. The oil may then be processed using conventional methods such as, desolventization, deodorization, degumming, bleaching and refining to yield an edible oil. Alternatively, the stabilized plant material can be processed for consumption.

With respect to brans in particular, following milling, enzymes present in the unstabilized grain products, such as lipases, peroxidases, catalases, polyphenol oxidases and lipoxygenases present in bran, become active. The active enzymes degrade the oils releasing free fatty acids (FFA). It is preferred that the FFA levels in the oils be less than about 10% and it is more preferred that the FFA levels be about 4% or less. FFA levels may be monitored using the official AOCS method Ca Sa-40.

The following examples are set forth to further illustrate certain preferred embodiments of the invention, and are not intended to be limiting in nature. In the example rice is utilized as the plant material, although one of ordinary skill in the art would be aware that the method is equally applicable to other plant materials.

Generally, the milling of rice is accomplished in a two step process in which the hulls are removed by shelling of the grain and then the bran is separated from the rice kernel by milling. The following is a typical protocol for the milling of rice, collecting the milled bran and stabilizing the bran oil.

Rough rice (paddy rice) from a farm is dried in a commercial-type continuous flow, non-mixing, heated air dryer. Drying is carried out to lower the moisture content of the rice from a level of between about 18 and 22 percent to a level between about 10 and 13 percent. The dried rice is then cleaned by removing dust, stones, seeds and sticks by aspiration in a commercial rice cleaning machine, followed by gravity separation in a stoner and particle size separation in a disk grader and a drum separator. The husks are then removed using a rubber roller sheller. Paddy (husks or hulls) were removed using a paddy separator for the first pass, followed by using a paddy separator for the second and third passes.

When stabilization of the bran is desired, the stabilizing agent is then applied to the brown rice either prior to milling the bran from the rice kernel in a friction mill or to the milled bran as it is aspirated from the rice kernels to yield polished rice. Preferably, the stabilizing agent is added to the brown rice prior to milling the bran. The stabilized raw bran is then conveyed to a filter/sifter to remove residual broken rice. The stabilized bran can now be utilized as a foodstuff without further processing, and can be stored, or packaged for shipping as desired. Alternatively, the oil can be extracted from the stabilized bran, and the extracted oil is suitable for human consumption.

As is apparent from the above description, the process according to the invention does not require the use of industrial food processing equipment and can be readily utilized with virtually any milling procedure.

As a specific example of stabilizing rice bran, sodium metabisulfite is added to brown rice to between about 1–10% of the dry weight of the bran. The sodium metabisulfite stabilizing agent is preferably prepared as a 20% solution for addition to the rice prior to milling the bran. Most preferably, the 20% solution of sodium metabisulfite includes 1000 ppm of the surfactant sodium dioctylsulfosuccinate as a wetting agent. The rice is then milled in a friction mill and the stabilized bran with the stabilizing agent is aspirated off and conveyed to a filter/sifter as above.

To improve extraction of oil from the rice bran, the stabilized bran may be fed directly into the feed hopper of an expander cooker. Water and steam are added through injection ports in the barrel of the expander to raise the moisture content of the bran to about 18–24%. Flow of the bran through the expander cooker is controlled by a discharge die plate. The moisture level is maintained during cooking and the temperature is held between about 90° C. and 135° C. for between about 15 and 90 seconds. During cooking some constituents of the bran are gelatinized into a fluid paste which binds the particles together. The bran is expanded as it exits the discharge die plate due to the sudden decrease in pressure which causes the liquid water to vaporize, and the bran forms a porous compact pellet. Vaporization of water causes breakage within the cells and a porous, compact bran pellet is formed which is ideally suited for extraction by solvent migration percolation. Prior to extraction the porous compact bran is cooled to approximately 130° F.

If the oil from 1–100 g of bran is to be extracted, the stabilized bran is immersed in hexane in a ratio by weight of about two to one. The hexane is generally heated to about 60° C. using a steam table incorporated into an explosion proof vented hood, but other solvents and other temperatures may also be employed. The hexane/oil micella is removed from the bran by filtration. About 5–6 washings are necessary to bring the oil content of the bran to less than one percent. The defatted bran and the hexane/oil micella are both desolventized under gentle heating with steam.

If the oil from 100–500 lbs. or more of stabilized bran is to be extracted, it is more practical to use the following protocol. The stabilized bran is fed into a counter-current extractor at a flow rate of about 111 lbs/hour. Fresh hexane is introduced at a rate of around 312 lbs/hr. The fresh solvent temperature is maintained at about 50° C., while the extractor temperature is maintained at around 52° C. The residence time in the extractor is typically around 45 minutes. The product is a defatted bran with an oil content of less than one percent. The hexane/oil micella exiting the discharge of the extractor is filtered through a plate and frame filter press. The filtered micella is then pumped to a steam heated still where the hexane is evaporated and collected by a condenser for reuse.

Following extraction and desolventization, crude rice bran oil is typically degummed, dewaxed, bleached and physically refined using steam distillation. Degumming is carried out by a two stage addition under agitation of 2% water by weight and then 0.15% phosphoric acid (85% reagent grade) by weight. The temperature is held at about 82° C. to 88° C. for 10 minutes. Then the sludge containing the gums is removed via ultracentrifugation. (See U.S. Pat. No. 4,049,686). The degummed bran is cooled to about 5° C. to 8° C. and held for 24 hours. The dewaxed oils form a layer above the waxes which can be decanted using a vacuum pump. Bleaching is carried out according to the official AOCS method 6c 8a-52. Physical refining is carried out in a glass deodorizer at about 250° C. and around 3 mm Hg for about 2 hours.

The level of free fatty acids (FFA) in the extracted oil is determined using the AOCS Official Method Ca Sa-40. Briefly, based upon the FFA range expected for the oil, a sample of oil having the appropriate weight is mixed with the appropriate amount of neutralized alcohol and then titrated with the standard sodium hydroxide while shaking until the appearance of the first permanent pink color, having the same intensity as that of the neutralized alcohol prior to addition to the oil sample, persists for 30 seconds. The neutralized alcohol solution consists of 95% alcohol containing 1% phenolphthalein which has been neutralized with alkali until a faint but permanent pink color persists. Specifically, to measure FFA in the range of 0.2–1%, about 28.2 g of sample oil is weighed, mixed with 50 ml of neutralized alcohol and then titrated with 0.1 N alkali, such as sodium hydroxide, until the appearance of the permanent pink color. Using oleic as an example, the %FFA is determined by multiplying the molecular weight of oleic with the normality of the alkali titrant and the volume of alkali titrant, which is then divided by the grams of sample and multiplied by 100.

The results of the FFA analysis in oil extracted from bran, which had been stabilized as described above or was left untreated, was determined over a period of several days and is displayed in Table 1. The stabilizing agent used in this example was 10% sodium metabisulfite on a dry weight basis. Similar results have been obtained using lower percentages of sodium metabisulfite and sodium bisulfate on a dry weight basis as the stabilizing agent. Our tests for the presence of degradative enzymes in the stabilized bran oil indicated that at least the lipases and peroxidases had been inactivated by treatment of the bran with the stabilizing agent.

In Table 1, Total oil means the percent of oil on a weight basis extracted from the bran. FFAIO means the percent of free fatty acid present in the extracted oil as measured by the AOCS Official Method Ca Sa-40. FFAIS means the percent of free fatty acid in sample, and represents the percent of FFA that would be present in unextracted bran. The amount of FFAIS is calculated based upon the FFAIO and the Total Oil in the sample as is established in the art.

TABLE 1

|  | Untreated Control | | | Treated with Stabilizing Agent | | |
| --- | --- | --- | --- | --- | --- | --- |
| Test Day | Total Oil | FFAIO | FFAIS | Total Oil | FFAIO | FFAIS |
| 1 | 21.58 | 2.88 | 0.65 | 18.92 | 2.33 | 0.38 |
| 2 | 21.63 | 9.43 | 1.95 | 19.31 | 2.59 | 0.58 |
| 3 | 19.94 | 16.18 | 3.19 | 18.51 | 3.06 | 0.56 |
| 4 | 21.17 | 16.32 | 3.39 | 19.04 | 3.13 | 0.57 |
| 5 | 20.00 | 19.77 | 3.95 | 18.14 | 3.31 | 0.60 |
| 6 | 19.58 | 20.42 | 4.00 | 18.63 | 3.14 | 0.58 |
| 7 | 20.69 | 28.59 | 5.92 | 18.29 | 4.01 | 0.73 |
| 8 | 19.71 | 31.47 | 6.20 | 18.08 | 4.19 | 0.76 |
| 9 | 20.68 | 32.89 | 6.80 | 18.39 | 4.48 | 0.82 |
| 10 | 21.04 | 31.11 | 6.52 | 21.13 | 4.62 | 0.85 |

As demonstrated in Table 1: (i) the total oil extracted from the treated and untreated samples is comparable, thus allowing direct comparison between the results of the tests for FFA levels; (ii) the FFAIO level in the treated sample remains low for the duration of the 10 day test period whereas the FFAIO level in the untreated control rises quickly to greater than 10%, thus demonstrating that the treated oil has been stabilized which significantly increases its economic value; and (iii) the FFAIS level in the treated sample remains low for the duration of the 10 day test period whereas the FFAIS level in the untreated control quickly rises, thus demonstrating that the stabilizing agent is capable of stabilizing the oil in the bran as well as the extracted oil.

A person having ordinary skill in the art would be aware that the described example may be altered to provide other embodiments which utilize the process of this invention. Therefore, it will be appreciated that the scope of this invention is to be defined by the appended claims, rather than by the specific embodiments which have been presented by way of example.

What is claimed is:

1. A method of preparing stabilized bran oil from grains comprising the steps of adding a stabilizing agent to grain in an amount effective to prevent enzyme degradation of the bran oil milling the grain to separate bran from the grain and extracting the stabilized oil from the bran.

2. The method of claim 1 wherein said stabilizing agent is added to said grain prior to milling.

3. The method of claim 1 wherein said stabilizing agent is added to milled bran as it is separated from said grain.

4. The method of claim 1 wherein said stabilizing agent is selected from the group consisting of salts of bisulfate, bisulfite and metabisulfite.

5. The method of claim 1 wherein said stabilizing agent is sodium metabisulfite.

6. The method of claim 1 wherein said stabilizing agent is sodium bisulfate.

7. A method of stabilizing oil from rice bran comprising the steps of adding a stabilizing agent to rice in an amount effective to prevent enzyme degradation of the bran oil, milling the rice to separate the bran from the rice, and extracting the stabilized oil from the rice bran.

8. The method of claim 7 wherein said stabilizing agent is added to brown rice prior to milling the bran.

9. The method of claim 7 wherein said stabilizing agent is added to milled rice bran as it is separated from rice kernels.

10. The method of claim 8 wherein said stabilizing agent is selected from the group consisting of salts of bisulfate, bisulfite and metabisulfite.

11. The method of claim 8 wherein said stabilizing agent is sodium metabisulfite.

* * * * *